United States Patent
Baumgartner et al.

[11] Patent Number: 5,864,935
[45] Date of Patent: Feb. 2, 1999

[54] PROCESS FOR PRODUCING A BRAKE DISC FOR A DISC BRAKE

[75] Inventors: Hans Baumgartner, Moosburg; Dieter Bieker, Raubling, both of Germany

[73] Assignee: Knorr-Bremse Systeme Für Nutzfahrzeuge GmbH, München, Germany

[21] Appl. No.: 823,070

[22] Filed: Mar. 24, 1997

Related U.S. Application Data

[63] Continuation of Ser. No. 318,791, filed as PCT/DE93/00326 Apr. 6, 1993 published as WO93/21453 Oct. 28, 1993, abandoned.

[30] Foreign Application Priority Data

Apr. 13, 1992 [DE] Germany .......................... 42 12 351.8
Feb. 5, 1993 [DE] Germany .......................... 43 03 418.7

[51] Int. Cl.$^6$ ..................................................... B23P 17/00
[52] U.S. Cl. .................... 29/416; 188/218 XL; 188/18 A
[58] Field of Search ........................ 188/218 XL, 218 R, 188/206 R, 18 A; 29/416, 888.09

[56] References Cited

U.S. PATENT DOCUMENTS

| | | | |
|---|---|---|---|
| 1,198,314 | 9/1916 | Baude | 29/416 X |
| 1,472,631 | 10/1923 | Bowman | 29/416 X |
| 1,498,748 | 6/1924 | Pierce, Jr. | 29/416 X |
| 4,860,419 | 8/1989 | Hekman | 29/888.09 |

*Primary Examiner*—Joseph M. Gorski
*Attorney, Agent, or Firm*—Pollock, Vande Sande & Amernick

[57] ABSTRACT

A process for producing a brake disc (1) for a disc brake is disclosed; in said process two separating regions ($3_1$, $3_2$) are provided in a one-piece, circular brake disc (1). Said separating regions divide the brake disc (1) into two parts (1a, 1b), whereupon a fastening device ($2_1$, $2_2$), which encompasses the separating region, is designed in each separating region ($3_1$, $3_2$); and finally the brake disc (1) is broken apart into two parts (1a, 1b) in the separating regions ($3_1$, $3_2$). Thus, a brake disc that is easier to mount and to exchange is provided.

3 Claims, 5 Drawing Sheets

PROCESS FOR PRODUCING A BRAKE DISC FOR A DISC BRAKE

This application is a continuation of U.S. patent application Ser. No. 08/318,791, filed Jan. 27, 1995 and now abandoned.

The invention relates to a process for producing a brake disc for a disc brake, which is provided especially for road vehicles and preferably for commercial vehicles. Furthermore, the object of the invention is a brake disc, produced according to the teaching of the invention, and a specific method for fastening such a brake disc to the hub of the vehicle.

To date the brake discs provided for commercial road vehicles were one-piece, so that they can be produced correspondingly in a simple and inexpensive manner by casting and finally facing the contact surfaces for the brake linings. However, one drawback with these known brake discs is that the replacement, which becomes necessary afer the contact surfaces exhibit too much wear, is associated with a complete diassembly of the wheel hub, a process that is very time intensive and induces correspondingly a high cost in wages. In addition, when the wheel hub is disassembled, their bearing housings have to be opened, so that they are exposed to a high risk of getting dirty and, therefore, may or may not have to be cleaned and filled with new lubricant, thus further increasing the cost of maintenance for replacing the brake disc.

In the case of rail-bound vehicles it is already known to use brake discs, which consist of two semi-circular parts and for the purpose of mounting are attached to each other at the axle of the rail-bound vehicle concerned. In such rail-bound vehicles the running wheels are shrunk rigidly on the axle, so that the brake discs, which are provided for replacement, may not be one-piece. Only the first fittings of the brake discs of each axle consist of a one-piece brake disc, which is fastened by means of a shrinking process and which is removed from the axle by means of a cutting-off wheel, for example, after said brake disc is worn off. One drawback with the known two-piece brake discs for rail-bound vehicles lies in their high cost of production. First, each of the two halves of the brake disc is produced separately, whereupon the two abutting ends are adapted as exactly to each other as possible via adjusting pins or bushings with the aid of a centering operation, in order to guarantee that the joint of the two halves is as planar as possible and does not cause the brake linings to wear excessively.

However, studies have shown that the unevennesses at the joint that occur, nevertheless, in known two-piece brake discs for rail-bound vehicles, are still so high that the use of such brake discs for road vehicles does not result in acceptable abrasion values. In addition, the additional costs for the production of such brake discs is also so high that it hardly compensates for the simplified maintenance work during the replacement of brake discs.

The invention is based on the problem of providing a process for producing a brake disc, which allows the brake disc to be replaced in a significantly simplified manner despite the inexpensive cost of production with the result that the brake disc does not cause an increased wear of the brake linings during operation.

This problem is solved according to the invention with the process steps cited in the characterizing part of claim 1.

Correspondingly the invention provides that a conventional one-piece brake disc has two separating regions, which divide the brake disc into two parts, whereupon a fastening device, encompassing said separating region, is designed in each separating region, and finally the brake disc is broken apart into two semi-circular parts in the separating regions. This process is extremely inexpensive to implement, so that the brake disc can be produced correspondingly inexpensively and, thus, costs hardly more than a conventional brake disc. Since the brake disc consists of two parts, the exchange of a worn brake disc for a new brake disc is drastically simplified, so that maintenance work on the brake can be done at a faster rate and lower cost.

Since the two parts of the brake disc are formed by a breaking process, the goal is also finally reached that, when said two parts are joined together, the granular fracture enables an almost ideal fixing of the two parts, so that there is no joint at the annular contact surfaces. Therefore, the linings of the brake shoe rub on a very uniform surface and, thus, do not show increased wear.

According to an improvement of the invention, cited in claim 2, a predetermined breaking point is formed within each separating region, for example, by means of a suitable material recess when casting the brake disc, thus guaranteeing a very reliable and exact breaking of the brake disc into its two parts.

According to claim 3, the fracturing can be facilitated optionally by subcooling the brake disc to be broken, whereby the then increased brittleness requires less force and under some circumstances makes it possible to obtain higher accuracy of the fracture.

According to claim 4, suitable fastening devices can be formed, for example, by means of at least two radially opposite boreholes, which run tangentially and vertically in relation to the respective separating region and exhibit internal threads for the screw connection.

According to claim 5, the course of the two separating regions is chosen in such a manner in the simplest case that the two separating regions are diametrically opposite each other in such a manner that two semi-circular brake disc parts, whose size is essentially the same, are formed. This symmetrical arrangement of the separating regions may or may not offer advantages during the actual braking process.

However, according to a special embodiment of the invention that is cited in claim 6, one can endeavor to arrange the two separating regions parallel to each other, but opposite with mutual offset, so that two brake disc parts, whose size is essentially identical, are formed; but their contact regions do not run on the diametral line. The consequence of this mutual offsetting of the separating regions, i.e. the fracture planes, is that the center of mass of each individual brake disc part acts in such a manner against this fracture plane that a significant amount of centrifugal force is absorbed by the teeth of the fracture, i.e. the structure of the fracture. By means of this effect the fastening devices, formed preferably by screws, are suitably relieved of the centrifugal force-induced stress. Correspondingly there exists the option of dimensioning these screws smaller, a feature that correspondingly lowers the cost of production.

If the central region of the brake disc according to the invention exhibits a flange ring for flanging the brake disc to a hub, it is recommended according to claim 8 that a recess be formed in the flange ring starting from where a respective separating region opens and running as far as the inner edge of the flange ring. Thus, the breaking of the brake disc may be significantly simplified, especially since the flange ring is usually connected to the contact surfaces of the disc by way of a hub-shaped connecting piece.

According to another important aspect of the invention, another especially effective kind of attachment to the hub of the vehicle is to be provided for a brake disc, produced according to the aforementioned process, but not exclusively for it, but rather optionally also for a conventional "one-piece" disc brake. Namely one important problem in fastening a brake disc to the hub is that the braking torque, which occurs during the braking operation, is transferred in essence to the hub via the frictional engagement. To maintain this frictional engagement adequately high, it is necessary to use either suitably dimensioned screws or a plurality of smaller screws. The result, on the one hand, is weight problems and, on the other hand, can result is significant space problems during the assembly process. Moreover, the cost of assembly using a plurality of screws is suitably increased by the increased amount of time.

Therefore, to remedy these drawbacks, the invention proposes according to claim 15 that the form-locking elements, which engage with a related fastening surface of the hub, be designed in the flange ring. Thus, the goal is reached that the braking torque that takes place during the braking operation is transferred in essence via positive locking to the hub. Thus, it is possible to dimension the screws correspondingly smaller or to reduce their number, a feature that results in a respective saving in weight and/or a reduced cost of assembly owing to the shape lock exhibiting no effects with respect to weight.

In an especially preferred embodiment essentially radial front teeth, which engage with the respective counter-teeth of the fastening surface of the hub, are designed in the flange ring for the form-locking elements according to the embodiment of claim 16. Such teeth can be formed exclusively from radial teeth, so that there is a socalled "serration".

As an alternative to such a serration, however, it is possible, according to claim 18, to let the teeth run parallel to each other within each teeth region, especially when the front teeth, according to claim 17, consist of several teeth regions, divided uniformly along the circumference of the flange ring. Under some circumstances this feature can have its advantages with respect to production.

When the above explained brake disc, containing such a shape lock, is provided for the purpose of fastening to a hub, where a wheel disk, serving for the attachment of the rim, can be attached detachably to an external face of the hub, an especially effective arrangement of the brake disc is achieved according to an embodiment of the invention as cited in claim 19, when the flange ring of the brake disc is designed in such a manner that the brake disc can be fastened between the wheel disk and the external face of the hub. This arrangement has the advantage that even undivided brake discs can be exchanged without having to disassemble the wheel bearing or the wheel hub. In addition, the force is introduced in an especially advantageous manner into the hub. Furthermore, there is the advantage according to claim 20 that the front teeth can be designed on the external side of the flange ring and can engage with counter-teeth designed as the mirror image on an internal ring surface of the wheel disk.

If, in contrast, the brake disc, explained above, is provided with a shape lock for the purpose of fastening to a hub, where the wheel disk, serving to fasten the rim, forms the external face of the hub, an especially optimal reciprocal arrangement can be achieved according to the invention, if, according to claim 21, the flange ring of the brake disc is designed in such a manner that the brake disc can be fastend to an internal ring surface of the wheel disk by way of the front teeth. In so doing, it is especially advantageous to arrange an intermediate ring between the flange ring of the brake disc and the internal ring surface of the wheel disk, whereby the bilateral teeth should be provided preferably between the flange ring of the brake disc and the intermediate ring. The intermediate ring is connected to the internal ring surface of the wheel disk preferably via fitting elements, preferably in the form of adapter sleeves or fitting pins.

In the following the invention is explained in detail using the description of the embodiments with reference to the drawings.

Figure 1:
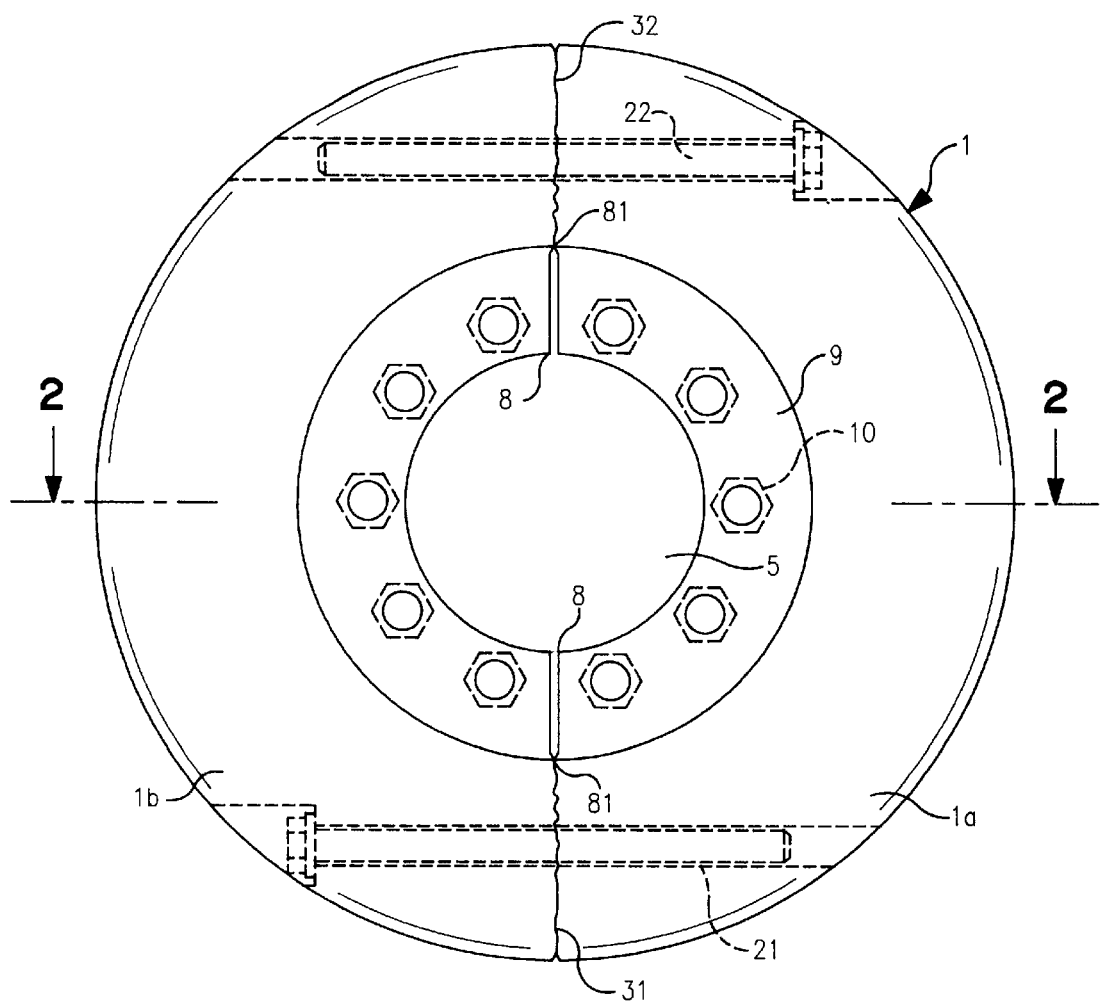
FIG. 1 is a top view of the schematic construction of the brake disc.

According to FIG. 1, the brake disc of the invention is formed first by means of a one-piece element 1. In this brake disc 1 a central borehole 5 is formed by the known method in order to receive a hub, where on the outer circumference of the borehole 5 several longitudinal boreholes 10 with respective internal threads are designed for fastening the brake disc 1 to the hub. The outer circumference of the borehole 5 is designed as a flange ring 9, which allows the brake disc 1 to be fastened to a hub N, which is shown only as a schematic in FIG. 2. As evident from the cross sectional view of FIGS. 5 and 6, the flange ring 9 can also be designed, however, in connection with a tubular or hub-shaped adapter, which connects the flange ring to the contact surfaces of the brake disc.

In the peripheral region of the brake disc 1 an annular circumferential surface is formed on each side, for example, by rotating. These circumferential surfaces form, optionally following an additional polishing operation, the contact surfaces, against which a caliper (not shown in detail), presses the brake linings by means of a clamping device, shown as a schematic in FIG. 5.

Up to these process steps the brake disc 1 of the invention corresponds to a conventional brake disc that has been used to date for commercial road vehicles.

According to the invention, separating regions 31 and 32, which extend in the radial direction and subdivide essentially the brake disc 1 into two semi-circular parts or halves 1a and 1b are provided in the brake disc 1, which is formed in this manner and exhibited by the first embodiment shown in FIG. 1. Predetermined breaking points are formed within these separating regions optionally, for example, by means of a suitable material recess while casting the brake disc 1 or through subsequent formation of a groove. Furthermore, two boreholes $2_1$ or $2_2$, which extend tangentially and vertically to the respective separating region and which extend through the separating region concerned, are formed in two radially opposite circumferential regions of the brake disc 1. In the part 1a of the brake disc 1, which is shown on the right side in the Figures, an internal thread is designed in the bottom borehole, whereas the part 1b, which is shown on the left, has the upper borehole with a respective internal thread. Thus, it is possible to connect the two parts 1a and 1b of the brake disc 1 by means of two screws, of which only a schematic is shown, while avoiding any imbalance. Of course, it is also possible to provided other screw connections of this kind as an option.

According to said embodiment of the separating regions $3_1$ and $3_2$ and the fastening devices $2_1$ and $2_2$, which encompass said separating regions, the brake disc 1 is broken apart along the separating regions $3_1$ and $3_2$ into two semi-circular parts 1a and 1b. The breaking apart of the brake disc 1 is facilitated by the aforementioned predetermined breaking point. An additional subcooling of the brake disc 1 leads to even better results when breaking apart the brake disc 1. In particular the grain structure at the joint is thus optimized, so that the abutting ends fit together exceptionally well.

The final production of the brake disc 1, such as especially the polishing of the brake contact surfaces or also the production of boreholes 10 for the purpose of attaching to the wheel hub, can be done both prior to and also after the brake disc 1 has been broken.

Figure 2:
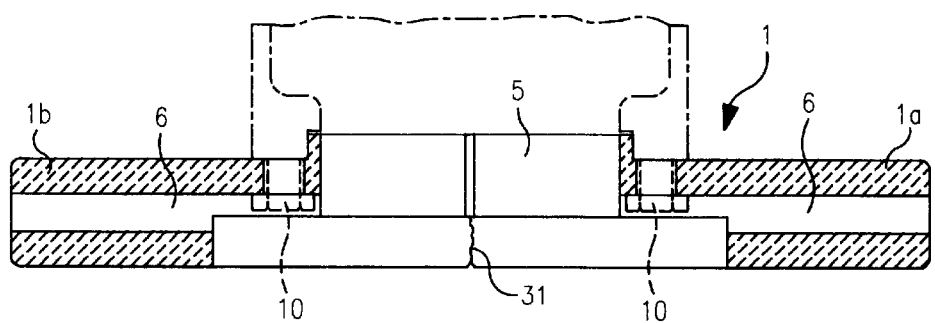
FIG. 2 is a radial sectional view of the brake disc shown in FIG. 1.

As apparent from the radial sectional view of FIG. 2, the brake disc 1 can be designed as a brake disc, which is ventilated on the inside and which exhibits in the known manner ventilation openings 6. Even with such ventilation openings the formation of boreholes for the screw connections $2_1$ and $2_2$ does not present a problem.

Figure 3:
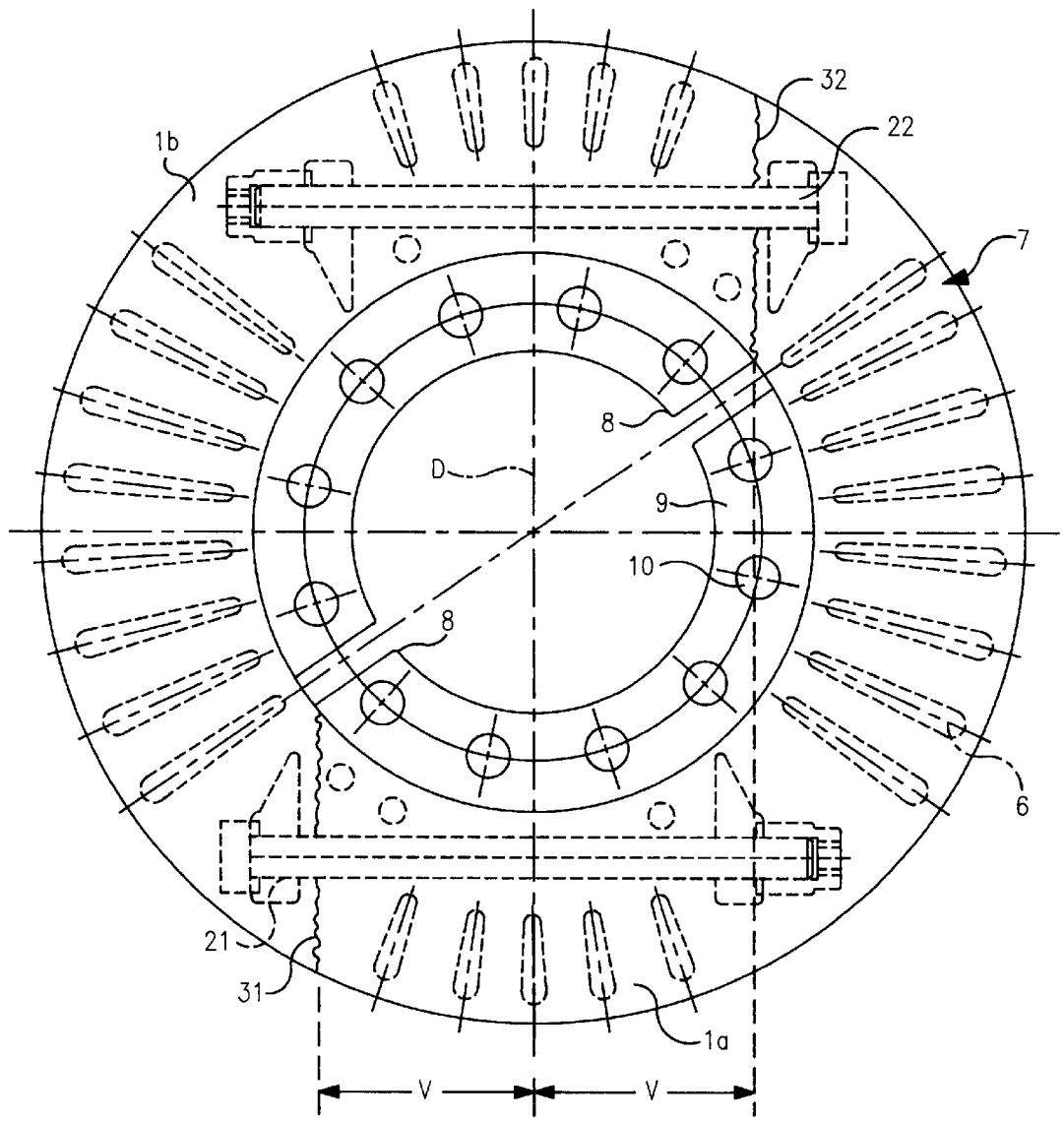
FIGS. 3 and 4 are top views of the schematic construction of other embodiments of the brake disc.
Figure 4:
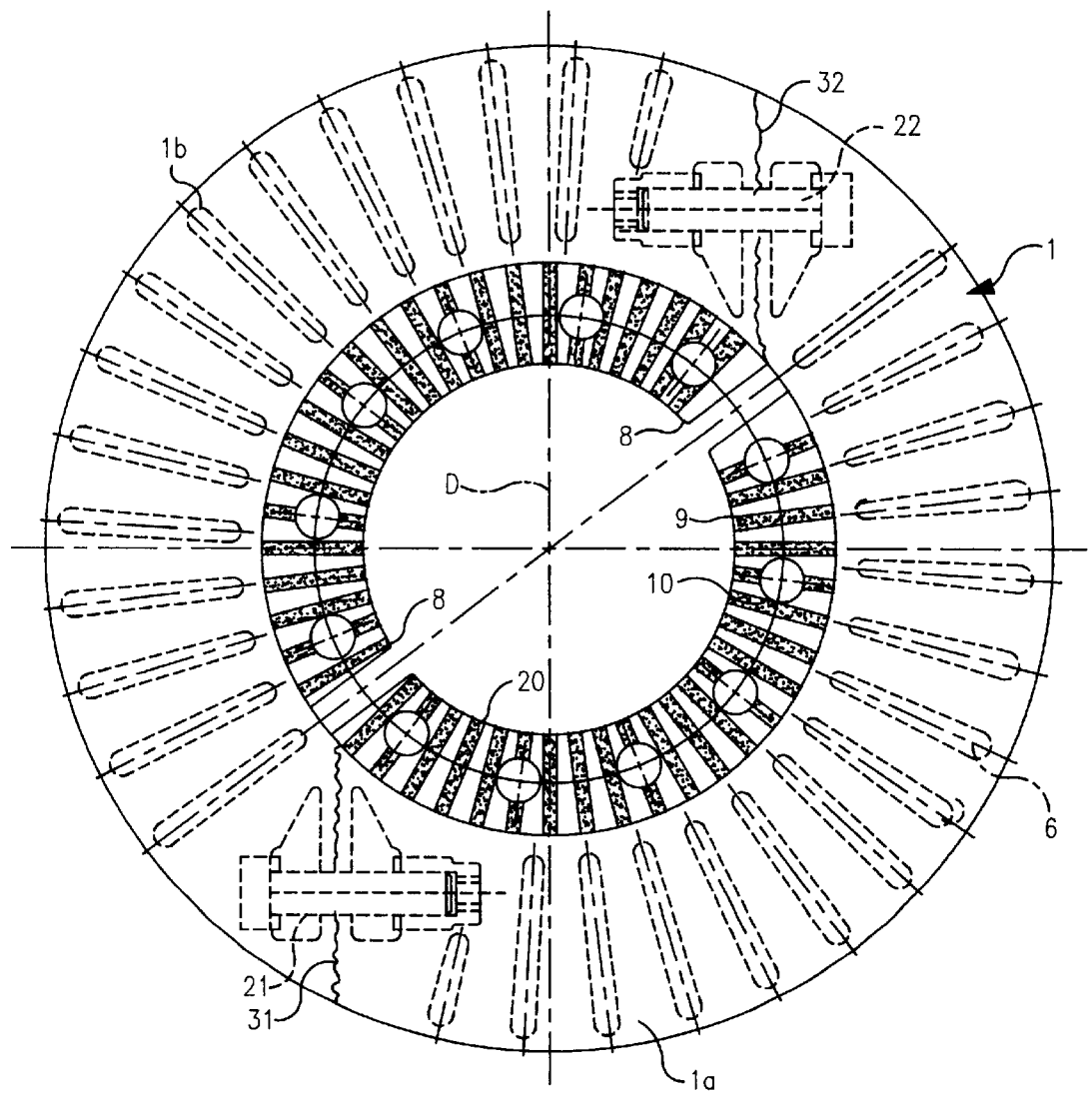
Figure 5:
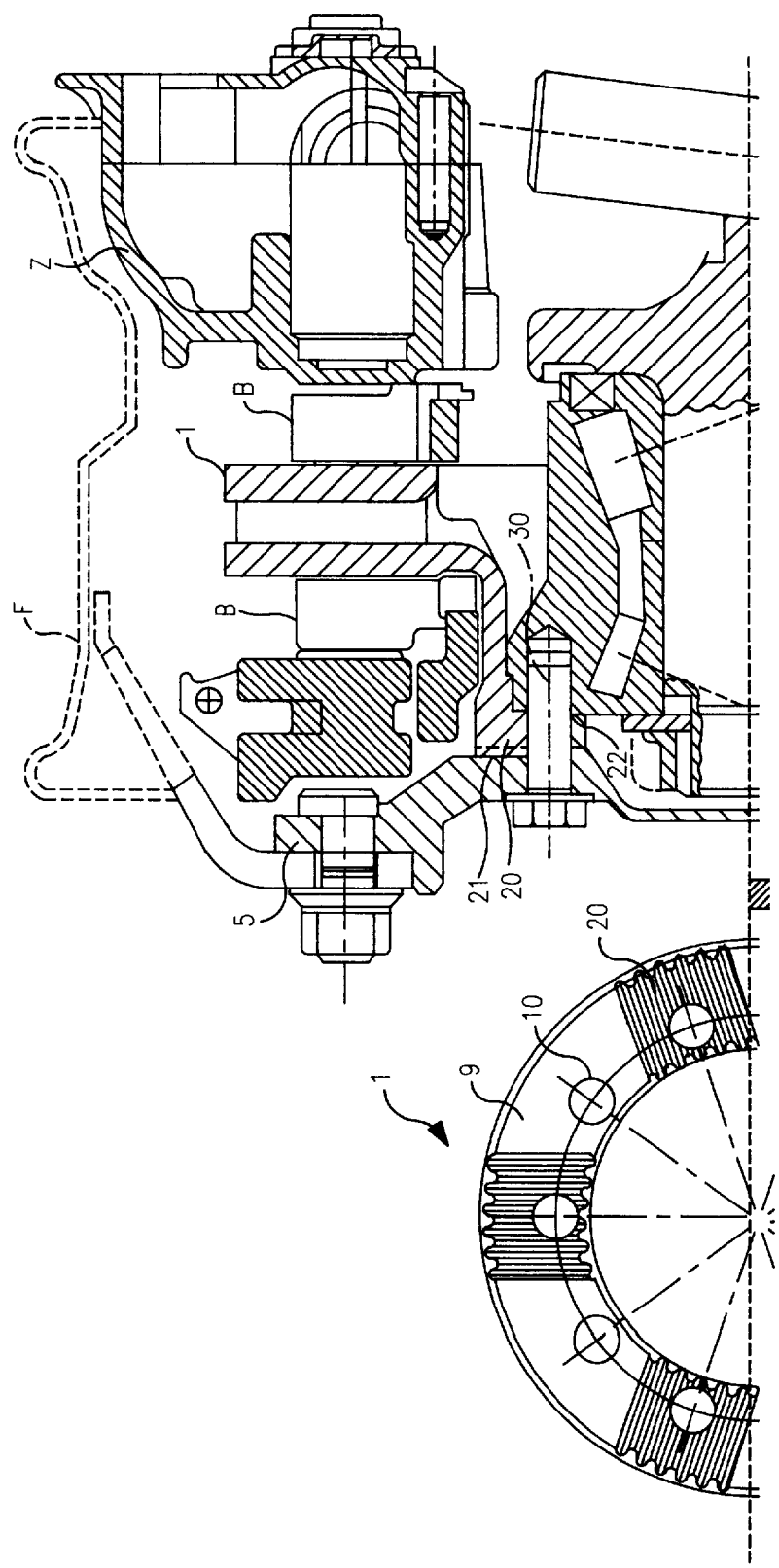
FIG. 5 depicts an embodiment of a brake disc, which is provided especially for the purpose of attaching to a hub shown schematically in the figure on the right.
Figure 6:
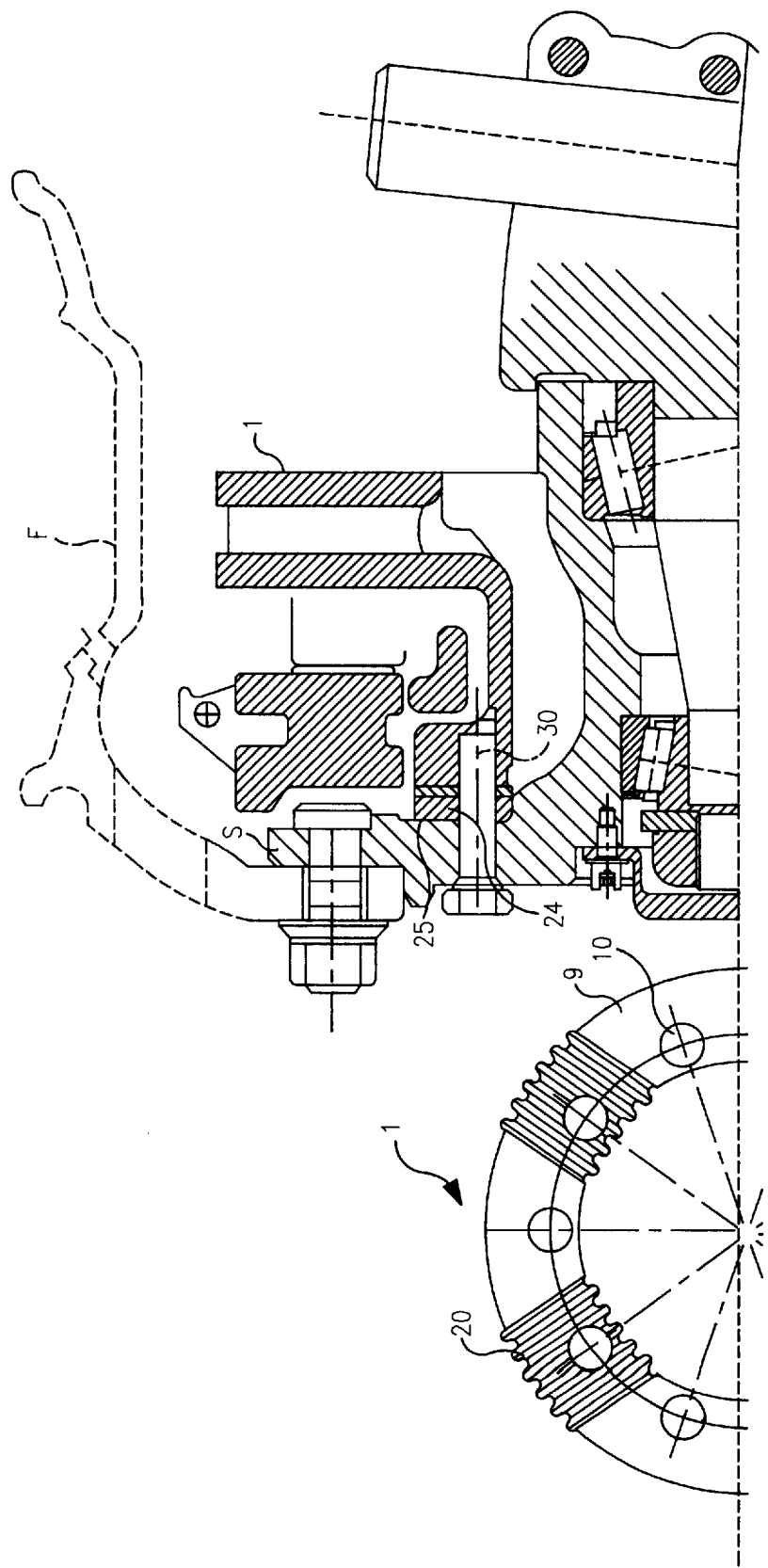
FIG. 6 depicts another embodiment of a brake disc, which is provided especially for the purpose of attaching to a different kind of hub.

Furthermore, it is clear from the top view of FIG. 1 or FIGS. 3 and 4 that a recess 8 is formed in the flange ring 9 starting from the point, which is marked with the reference numeral 81 and at which the respective separating region $3_1$ or $3_2$ opens, and extending as far as the inner edge of the flange ring 9. Such a recess can significantly simplify the breaking of the brake disc, especially since the flange ring 9, as evident from FIGS. 5 and 6, is usually connected with the contact surfaces of the brake disc by way of a hub-shaped connecting piece.

In the following a modification of the production process of the invention is explained in detail with reference to FIG. 3, which is a top view of a brake disc 1 that is similar to the brake disc shown in FIG. 1. According to FIG. 3, this variation of the production process differs from the production process explained with reference to FIG. 1 in that the two separating regions $3_1$ and $3_2$ do not lie on the diametral line of the brake disc 1, i.e. are diametrically opposite, but rather are arranged parallel to each other with mutual offset. Thus, the separating region $3_1$ is arranged parallel to the diametral line of the brake disc 1 denoted as D, and in particular at a distance denoted as V. In the same manner the other separating region $3_2$ is arranged parallel to the diametral line D at the same distance V. Thus, the two separating regions $3_1$ and $3_2$ exhibit a mutual offset of 2V. Consequently two brake disc parts 1a and 1b are formed that exhibit in essence the same size, but their respective separating regions are not on the diametral line of the brake disc 1, as immediately apparent from the top view of FIG. 3.

By staggering the two separating regions $3_1$ and $3_2$ the goal is reached that the center of mass of each individual brake disc part 1a and 1b acts in such a manner against the fracture plane designed in the separating region concerned that a large portion of the centrifugal forces can be absorbed by the teeth of the fracture structure of the fracture plane. With this effect the goal is reached that the screws (of which only a schematic is shown) and which belong to the fastening device $2_1$ or $2_2$ are relieved of the centrifugal force-induced stress. Thus, it is possible to dimension the fastening devices $2_1$ and $2_2$ or their screws correspondingly weaker. Thus, this measure has a positive effect on the cost of production and has, moreover, the advantage that less installation space is needed for the screw connection.

As in the production process explained with reference to FIG. 1, this variation also has two recesses 8 in the flange ring 9; said recess extends from that point at which the separating region $3_1$ or $3_2$ opens into the flange ring 9 as far as the inner edge of the flange 9, and in particular essentially in the radial direction. As already explained above, owing to this measure it is enough to break only the external region of the brake disc 1 that bears the contact surfaces. Thus, the production of the brake disc 1 of the invention is correspondingly simplified.

FIG. 4 shows a process that is modified with respect to the production process of FIG. 3 and in which the two fastening devices $2_1$ and $2_2$ are not symmetrical in relation to the diametral line as in the preceding embodiments, but rather are arranged somewhat symmetrically to the separating region $3_1$ or $3_2$. This measure allows the screw connections to be significantly shorter, a feature that has a positive effect on the total weight of the brake disc 1. Moreover, the cost for the screws is reduced correspondingly.

The embodiment of FIG. 4 shows another important feature of the present invention. In the case of this brake disc form-locking elements are provided in the form of front teeth 20 in the flange ring 9. The respective fastening surface of a hub has front teeth, which are designed so as to be suitably mirror inverse, so that the brake disc 1 in the flanged state engages with these counter-teeth. With this measure the goal is reached that the braking torque is not transferred through frictional engagement as in the state of the art, but rather in essence through shape lock.

Therefore, this measure allows either the number of screws provided to attach the brake disc 1 to the hub to be significantly reduced or allows, as an alternative, screws with a smaller diameter to be used. In addition to the saving in weight and cost that is achieved in this manner, the assembly of the brake disc 1 is also facilitated and there is the possibility of also providing a flanging that is adequately torque resistant in the narrow installation conditions.

The teeth 20 shown in the embodiment of FIG. 4 consist of teeth, which are distributed uniformly over the flange rings 9 and all of which extend radially, so that a socalled "serration" is formed. It is clear that such teeth can also be provided for the brake discs shown in FIGS. 1 and 3 in order to increase the braking torque that can be transferred. Moreover, it is possible to provide such teeth even for undivided brake discs.

In the brake disc 1 shown in FIGS. 5 an 6, an alternative embodiment of the teeth of the invention is shown, where the front teeth 20 consist of several teeth regions that are distributed uniformly along the circumference of the flange ring 9 and that are arranged preferably in the region of a respective attachment borehole 10 of the flange ring 9. Another difference with respect to the serration shown in FIG. 4 is that the teeth run parallel within each teeth region 20; this kind of teeth can exhibit advantages with regard to production. Even this kind of teeth according to the invention can be used to flange the undivided brake discs, but advantages are achieved thus especially with the brake discs that are broken according to the invention.

FIGS. 5 and 6 show two possibilities for fastening the brake discs, which exhibit the invention and which are especially good and effective. FIG. 5 depicts a hub, in which a wheel disk S, which serves the purpose of fastening the rim, denoted as F, can be fastened detachably to an external face 22. In contrast, FIG. 6 shows a hub of the conventional construction, in which a wheel disk S, which serves the purpose of fastening the rim F, forms the external face of the hub. In contrast to the hub shown in FIG. 5, the brake disc 1 can be exchanged in the case of the hub of the embodiment of FIG. 6 without disassembling the hub or the wheel bearing only if a broken brake disc is used in accordance with the teaching of the invention.

The right hand side of FIG. 5 is a schematic sectional view of the basic construction of a wheel hub. This wheel hub bears a wheel disk S, which is fastened detachably via screws and to which a rim F is fastened using screws. The contact surfaces of the brake disc 1 rotate within the rim F, whereby a clamping device Z presses two brake shoes B against each contact surface of the brake disc 1 when the brake is operated, so that a respective braking torque is produced. The invention provides that the flange ring 9 of the brake disc 1 is designed in such a manner that the brake disc 1 can be fastened between the wheel disk S and the external face 22 of the hub. Thus, the goal is reached that the screw connection 30 can be used both for attaching the wheel disk S and also for attaching the brake disc 1. Moreover, an especially compact type of construction is obtained for the hub. In this arrangement of the brake disc 1 the front teeth 20 are designed on the external side of the flange ring 9 and thus engage with counter-teeth, which are designed mirror inversely on an internal ring surface 21 of the wheel disk S. Owing to this measure the braking torque of the brake disc 1 is transferred especially effectively to the rim F and thus to the tires.

In the conventional hub shown in FIG. 6 the flange ring 9 of the brake disc 1, as apparent from the cross sectional view shown on the right hand side, is shaped in such a manner that the brake disc 1 can be fastened via its front teeth 20 to an internal ring surface 25 of the wheel disk S. Since the formation of respective counter-teeth on this internal ring surface 25 of the wheel disk S encounters problems with regard to production, the invention provides an intermediate ring 24, on whose surface facing the flange ring 9 the requisite counter-teeth are formed. To transfer the braking torque from the intermediate ring 24 to the internal ring surface 25 of the wheel disk S, fitting elements (not shown in detail in FIG. 6) are used; they can be, for example clamping sleeves or fitting pins. Thus, outstanding transfer of the braking torque is guaranteed. Moreover, this method of attaching the brake disc of the invention has the advantage that there is no bonding to a specific diameter of the bolthole circle and the wheel forces themselves are transferred to the hub, so that significantly smaller screw connections can be realized.

The type of assembly for the brake disc 1 that is explained with reference to FIGS. 5 and 6 is also applicable to conventional, undivided brake discs, which are supposed to be provided preferably with the teeth of the invention.

With respect to other advantages and effects of the invention that are not explained in detail, reference is made explicitly to the disclosure of the drawings.

We claim:

1. A process for producing a brake disc, comprising the steps of:

(a) providing a one-piece disc having an outer circumference, a center, and a central bore;

(b) defining two parallel separating regions, each of said regions extending from said outer circumference to said central bore and being located opposite one another with mutual offset relative to said center;

(c) breaking said disc along each of said separating regions, thereby dividing said disc into two substantially identical disc portions each having two series of teeth;

(d) intermeshing the two series of teeth of one of said disc portions with the two series of teeth of the other of said disc portions, respectively, thereby forming said disc portions into a disc-shaped configuration; and then (e) passing a fastener through each series of intermeshing teeth, respectively, thereby maintaining said disc portions in said disc-shaped configuration.

2. The process according to claim 1, including forming a predetermined breaking location each separating region.

3. The process according to claim 1, including the step of sub-cooling said disc prior to breaking.

* * * * *